US008858658B2

(12) United States Patent
O'Brien et al.

(10) Patent No.: US 8,858,658 B2
(45) Date of Patent: Oct. 14, 2014

(54) STABILIZATION OF FATTY OILS AND ESTERS WITH ALKYL PHENOL AMINE ALDEHYDE CONDENSATES

(71) Applicant: Baker Hughes Incorporated, Houston, TX (US)

(72) Inventors: Timothy J. O'Brien, Sugarland, TX (US); Brian R. Munson, Rosenberg, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/848,524

(22) Filed: Mar. 21, 2013

(65) Prior Publication Data

US 2013/0283678 A1    Oct. 31, 2013

Related U.S. Application Data

(62) Division of application No. 12/270,071, filed on Nov. 13, 2008, now Pat. No. 8,430,936.

(60) Provisional application No. 60/991,406, filed on Nov. 30, 2007.

(51) Int. Cl.
*C10L 1/222* (2006.01)
*C10L 10/00* (2006.01)
*C10L 1/223* (2006.01)

(52) U.S. Cl.
CPC ............. *C10L 1/2225* (2013.01); *C10L 10/00* (2013.01); *C10L 1/223* (2013.01); *Y02E 50/13* (2013.01); *C10L 1/222* (2013.01)
USPC .......................................................... 44/425

(58) Field of Classification Search
CPC ...................................................... C10L 1/222
USPC ..................................... 44/415, 425; 137/13
See application file for complete search history.

(56) References Cited

U.S. PATENT DOCUMENTS

| 4,166,726 A | 9/1979 | Harle |
| 6,270,539 B1 | 8/2001 | Henly |
| 2004/0006912 A1 | 1/2004 | Krull |
| 2004/0168364 A1* | 9/2004 | Macduff et al. ................. 44/415 |
| 2006/0201056 A1 | 9/2006 | Jordan |
| 2006/0218855 A1 | 10/2006 | Asbahr et al. |
| 2006/0219979 A1 | 10/2006 | Asbahr et al. |
| 2007/0113467 A1 | 5/2007 | Abou-Nemeh |
| 2007/0137098 A1 | 6/2007 | Martyak et al. |
| 2007/0151143 A1 | 7/2007 | Li et al. |
| 2007/0289203 A1 | 12/2007 | Deblase et al. |
| 2009/0107555 A1* | 4/2009 | Aradi .............................. 137/13 |

FOREIGN PATENT DOCUMENTS

| EP | 534668 | | 9/1992 |
| EP | 1010747 | A1 | 6/2000 |
| WO | 9006982 | A1 | 6/1990 |
| WO | 03078552 | A1 | 9/2003 |
| WO | 2007062304 | A2 | 5/2007 |
| WO | 2008124390 | A2 | 10/2008 |
| WO | 2009016400 | A1 | 2/2009 |
| WO | 2009040582 | A1 | 4/2009 |

OTHER PUBLICATIONS

M Bender, "Economic Feasibility Review for Community-Scale Farmer Cooperatives for Biodiesel," Bioresource Technology, 1999, pp. 81-87, vol. 70.
Southwest Research Institute, "Characterization of Biodiesel Oxidation and Oxidation Products," Technical Literature Review, Aug. 2005, SRI, San Antonio, Texas.
R. L. McCormick, et al., "Oxidation Stability of Biodiesel and Biodiesel Blends," ASTM, Jun. 2006, National Renewable Energy Laboratory.
U.S. Dept. of Energy, "Biodiesel: Handling and Use Guidelines", Sep. 2006.

* cited by examiner

*Primary Examiner* — Prem C Singh
*Assistant Examiner* — Chantel Graham
(74) *Attorney, Agent, or Firm* — Mossman, Kumar & Tyler, P.C.

(57) ABSTRACT

Biodiesel fuels, renewable diesel fuels and feedstocks to these fuels (derived from plant seed oils or animal fats) are viewed as more environmentally friendly, renewable alternative fuels or supplemental fuels with petroleum-based diesel. Alkyl phenol amine aldehyde condensates improve the stability of biofuels by inhibiting the degradation processes. Alkyl phenylene diamines employed together with alkyl phenol amine aldehyde condensates in the biofuels give synergistically improved stability of the fuels.

13 Claims, No Drawings

STABILIZATION OF FATTY OILS AND ESTERS WITH ALKYL PHENOL AMINE ALDEHYDE CONDENSATES

CROSS-REFERENCE TO RELATED APPLICATION

This application is a divisional application of U.S. patent application Ser. No. 12/270,071 filed Nov. 13, 2008, which issued as U.S. Pat. No. 8,430,936 on Apr. 30, 2013; which claims the benefit of U.S. Provisional Application No. 60/991,406 filed on Nov. 30, 2007.

TECHNICAL FIELD

The present invention relates to methods and compositions for improving biofuels (including biodiesel fuels, renewable diesel fuels, and related feedstocks) and more particularly to the use of alkyl phenol amine aldehyde condensates alone or together with alkyl phenylene diamines to improve biodiesel fuels by extending their oxidative stability and, in turn, inhibiting residue formation and discoloration.

TECHNICAL BACKGROUND

It is well known that as the cost of crude oil increases, numerous efforts have been made to find and develop alternative fuels, particularly fuels that have a renewable, rather than a limited, source. Considerable effort has been expended researching potential fuels from regenerable biological sources, or biofuels. Biofuels, in the context herein, include biodiesel and renewable diesel, which are diesel fuel-equivalents, processed fuel derived from biological source feedstocks (such as plant seed oils, vegetable oils and animal fats), and which may be used in unmodified diesel engine vehicles. Such fuels are viewed as more environmentally friendly, renewable alternative or supplement fuels to and with conventional petroleum-based diesel. Biofuels are also seen as having the advantage of reducing dependence on foreign-sourced petroleum based oil. Characteristically, the biodiesel has a high flash point for safe handling, has good lubricity, is biodegradable, has reduced emissions (lower particulate matter, carbon oxides and unburned hydrocarbons), and its use fits with existing infrastructure. Alternatively, the renewable diesel is not hygroscopic, has improved cold flow properties for low-temperature handling, has reduced emissions, has higher cetane values to improve the combustion quality, and its use also fits with existing infrastructure.

In the context herein, biodiesel fuels include, but are not necessarily limited to, alkyl esters of a fatty acid, typically either the ethyl ester or methyl ester of a fatty acid. Thus, many biodiesel fuels may be understood to contain fatty acid methyl esters (FAME). The FAMEs or blends thereof are typically referred to as biodiesel. For instance, blends of FAME with No. 2 fuel oil may be referred to as biodiesel. Most biodiesel fuel is presently made by the transesterification of fatty acids. Biodiesel fuel may also be made from free fatty acids using an acid catalyst. There are other processes that use an ion-exchange resin catalyst.

In more detail, most biodiesel fuels are made from vegetable oils, including, but not necessarily limited to rapeseed, soybean, cotton seed, corn, jotropha and the like oils. Some biodiesel is made from animal fats, including, but not limited to beef and pig tallow, chicken fat, fry grease, restaurant trap grease, fish oil, and the like. Efforts are also being made to blend FAME compounds to modify properties such as low temperature handling, for instance esters from palm and soybean oils or soybean and tallow oils (e.g. beef). The mixtures may be complex. All of these fall within the definition of biofuels herein.

Non-esterified or straight vegetable oils (SVO) or straight waste vegetable oil (WVO) are examples of typical biomass feedstocks for the production of biodiesel or renewable diesel. However, biodiesel and renewable diesel fuels as defined herein may include these non-esterified SVOs or WVOs in minor proportions (less than 50 volume %, and in another embodiment less than about 1%). In the context herein, renewable diesel fuels include, but are not necessarily limited to, the hydrocarbon products resulting from the reactions of plant or animal oils under various conditions, not to include esterification. In more detail, renewable diesel fuels can be prepared from the direct hydrotreating of the plant or animal oil feedstocks, through the Fischer-Tropsch process (coal-to-liquid or gas-to-liquid catalyzed reactions), direct pyrolysis of biomass, or through an algae (or other biological organism) production system. As with biodiesel, efforts are being made to blend renewable diesel with petroleum-based fuels to modify properties such as decreased emissions. The mixtures may be complex. All of these fall within the definition of biofuels herein.

The biodiesel fuel B100 has a particular definition, including, among other parameters, a minimum ester content of 96.5 wt %. It may be made by transesterifying triglycerides from plant or animal-based fatty acid oils with alcohol in the presence of a catalyst.

Biofuel instability occurs due to higher levels of unsaturated compounds, which are sites for oxidation reaction over time, and which are accelerated at elevated temperatures and by the presence of contaminants including metals and sulfides. This instability due to oxidative degradation is greater than that associated with conventional petroleum diesel. During transportation and storage, biofuel may be subjected to conditions that promote oxidation of their unsaturated components subsequently degrading quality and performance with undesirable characteristics of residue, acidity, odor and discoloration.

There is a need to improve the stability of biofuels and feedstocks. It is desirable to discover a method and/or composition for improving the stability of biofuel, feedstocks and biofuel blends.

SUMMARY

There is provided, in one non-limiting embodiment a method for improving the stability of a biofuel, comprising adding to the biofuel an alkyl phenol amine aldehyde condensate additive in an amount effective to improve the stability thereof. Optionally, an alkyl phenylene diamine may also be employed.

Further, there is provided in another non-restrictive version an improved biofuel that contains fatty acid methyl esters, hydrocarbons, or oils and an alkyl phenol amine aldehyde condensates in an amount effective to improve the stability of the fuel. Again, optionally, an alkyl phenylene diamine may also be employed.

DETAILED DESCRIPTION

In accordance with the present invention, it has been unexpectedly discovered that certain alkyl phenol amine aldehyde condensates, such as dodecyl phenol polyamine formaldehyde Mannich base, are surprisingly effective at improving the stability of biofuels. These additives protect the biofuel by inhibiting the degradation process. The storage stability of the biofuel is extended and the end-use quality is improved.

In another non-limiting embodiment, it has also been unexpectedly discovered that the alkyl phenol amine aldehyde condensates used together with alkyl phenylene diamine-type chemistries form a synergistic blend to stabilize these monoalkyl esters of long-chain fatty acids, typically FAME, and mixtures thereof with conventional No. 2 fuel oil commonly referred to as biodiesel. This combination also inhibits the oxidation process and protects against product degradation, extending the FAME/biofuel storage stability to improve end-use quality.

The exact mechanism by which the methods herein operate is not known, and thus the inventors herein do not wish to be limited by any particular explanation. The treatment with these additives has at least the effect of increasing the oxidative stability of the biofuel. The stability of the biofuel is improved as compared with a biofuel absent the additive. Improving the biofuels by this method is relatively more economical compared to some alternative methods.

The alkyl phenol amine aldehyde condensate may have the general formula:

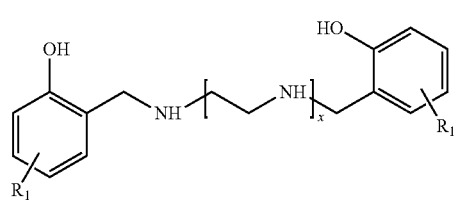

where $R_1$ are independently straight or branched alkyl groups of $C_1$-$C_{20}$ and may be located at the ortho, meta or para positions, alternatively of $C_4$ to $C_{16}$, where x ranges from 1 to 5. The condensates of general formula (I) may be made by reacting an alkyl phenol with an aldehyde (e.g. formaldehyde) and a polyamine (e.g. ethylenediamine), such as schematically illustrated below:

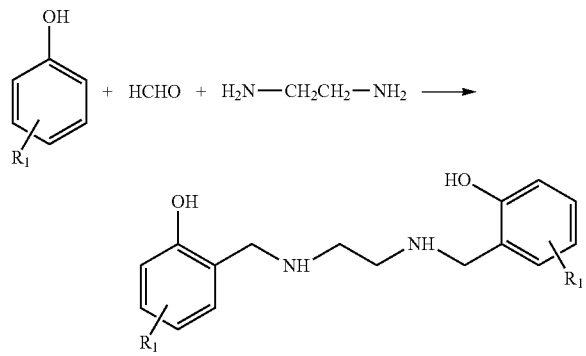

where $R_1$ is as defined above. Representative, non-limiting examples for $R_1$ are butyl, amyl, nonyl, dodecyl, and the like. Specific examples of suitable alkyl phenol amine aldehyde condensates include, but are not necessarily limited to, dodecyl phenol ethylenediamine formaldehyde Mannich base, nonyl phenol diamine formaldehyde Mannich base, amyl phenol diamine formaldehyde Mannich base, and butyl phenol diamine formaldehyde Mannich base.

Suitable polyamine reactants may have the general formula $H_2N—(CH_2CH_2NH)_x—H$ where x ranges from 1 to 5; and in an alternate embodiment, x ranges from 1 to 3. Suitable diamine reactants include, but are not necessarily limited to, ethylene diamine, diethylene triamine, triethylene tetramine, and the like.

While it is expected that formaldehyde will be the most likely aldehyde used to make the condensates of general formula (I), other aldehydes such as acetaldehyde, propionaldehyde and the like may also be used.

In general, the mole ratio of reactants to make the condensates of general formula (I) will be about 1 mole of polyamine to about 2 moles aldehyde to about 2 moles alkylphenol, however the ratio may also be about 1 mole polyamine to about 2 moles aldehyde to about 1 mole alkylphenol. The reaction conditions are generally such that the mixture of alkylphenol, polyamine and aldehyde are present in a solvent, typically an aromatic solvent, which is heated to reflux and water is removed. The reaction is considered complete once water is no longer coming off the reaction.

In one non-limiting embodiment, the amount of alkyl phenol amine aldehyde condensate employed as an additive in the biofuel to improve its stability ranges from about 10 to about 10,000 ppm, based on the biofuel. Alternatively, the amount of alkyl phenol amine aldehyde condensate may have a lower threshold of about 100 ppm, and independently an upper threshold of about 2000 ppm.

The alkyl phenylene diamines useful as oxidative stabilizers in the methods and compositions herein may have the general formula:

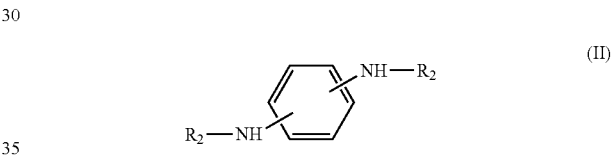

where $R_2$ are independently straight or branched alkyl groups of $C_1$-$C_{20}$, alternatively of $C_4$ to $C_{16}$. The diamines may be in the para, ortho or meta position with respect to one another. Suitable alkyl phenylene diamines include, but are not necessarily limited to, N,N'-di-sec-butyl-p-phenylenediamine, N,N'-di-iso-butyl-p-phenylenediamine, and N,N'-di-iso-propyl-p-phenylenediamine.

In one non-limiting embodiment, the amount of alkyl phenol amine aldehyde condensate and alkyl phenylene diamine in the non-restrictive embodiment when both are employed as additives in the biofuel to improve its stability ranges from about 10 to about 10,000 ppm, based on the biofuel. Alternatively, the amount of alkyl phenol amine aldehyde condensate may have a lower threshold of about 50 ppm, and independently an upper threshold of about 1500 ppm.

The resulting additive, be it alkyl phenol amine aldehyde condensate alone or together with an alkyl phenylene diamine, may be added to the biofuel to be treated by standard techniques, such as by injection or simple pouring and it may be dispersed throughout the fuel by stirring or other agitation. The additive is incorporated at a level sufficient to improve the fuel stability. In practice, one would dose test bottles with varying amounts of the additive to determine how much is required to give the desired stability.

The biodiesel containing FAME may be any biofuel as previously defined. The biofuels may contain other oxygenated compounds besides esters, such as alcohols, glycols, ethers and the like and mixtures thereof.

Effective treatment may be carried out at the ambient temperature of the biofuel (e.g., about 20° C. for stored fuel), but the performance of the additive is expected to be effective at typical storage and handling as well as engine operating temperatures (e.g., about 20° C. to 200° C.). Thus, the additive may still be employed at such elevated temperatures with good results.

In one non-restrictive version, the oxidative stability of a biofuel is measured using the Rancimat Test EN14112, which is a test that accelerates oxidation of the fuel. This biofuel stability test method generally involves measuring the induction time for volatile oxidation product formation in hours as related to resistance to oxidation or oxidation reserve, or the time to the start of deposit formation. In more detail, this test involves passing air through a sample of the biofuel at an elevated temperature. As oxidation occurs, volatile oxidation products are formed which are swept from the sample and collected in a downstream cell. The conductivity of the solution in the cell is monitored during the test. It is determined when enough oxidation of the biofuel has occurred that sufficient volatile oxidation products are formed and swept from the sample to cause a spike in conductivity of the cell. The method takes the maximum second derivative of the conductivity curve as the induction period. The longer that the sample can be heated/sparged with air before this spike in volatile oxidation products formation occurs, the more stable the biofuel is.

Stability is a concern with biofuel storage. As noted previously, many of the feedstocks for the biofuels are oils like rapeseed or soybean oils. The fatty acid chains in these oils contain unsaturation (oleic, linoleic, linolenic etc.) which is subject to oxidation. It does not take much unsaturation in the oils to be a potential problem. Stability is important because the unsaturation tends to discolor and eventually form solids (gums) as a result of oxidation during storage. The potential solids/discoloration of the biofuels makes them less attractive as a fuel to an end user and can potentially cause engine issues such as filter or injector fouling.

Other commonly used, optional components in biofuels and biofuel blends (e.g., B2, B5, B20) include, but are not necessarily limited to, detergents, antiwear agents, demulsifiers, corrosion inhibitors, metal deactivators, cold flow improvers, antifoams and biocides.

The following examples describe certain specific embodiments of the invention. Other embodiments within the scope of the claims herein will be apparent to one skilled in the art from consideration of the specification or practice of the methods as disclosed herein. It is intended that the specification, together with the examples, be considered exemplary only, with the scope and spirit of the invention being indicated by the claims which follow the examples. In the examples, all percentages are given on a weight basis unless otherwise indicated.

EXPERIMENTAL

The Rancimat stability tests were conducted on nine different plant-derived B100 biofuels. The various additives used are identified in Table I.

TABLE I

| Oxidative Stability Additives | |
|---|---|
| Experimental designation | Identity |
| Y7BH1018 | Dodecyl phenol ethylenediamine formaldehyde Mannich base |
| Y7BH1100 | Nonyl phenol ethylenediamine formaldehyde Mannich base |

TABLE I-continued

| Oxidative Stability Additives | |
|---|---|
| Experimental designation | Identity |
| Y7BH1019 | N,N'-di-sec-butyl-p-phenylenediamine |
| Y7BH1068 | 92.5% to 7.5% blend of nonyl phenol ethylenediamine formaldehyde Mannich base to N,N'-di-sec-butyl-p-phenylenediamine |
| Y7BH1099 | 80% to 20% blend of nonyl phenol ethylenediamine formaldehyde Mannich base to N,N'-di-sec-butyl-p-phenylenediamine |

Examples 1-42 were conducted where an alkyl phenol amine aldehyde condensate was used as the only antioxidant additive.

TABLE II

| Rancimat Results | | |
|---|---|---|
| Ex. | Fuel 1878-119-7 | |
| 1 | Blank | 0.2 hr |
| 2 | 1150 ppm Y7BH1100 | 6.3 hr |
| 3 | 1200 ppm Y7BH1100 | 6.5 hr |
| 4 | 1500 ppm Y7BH1100 | 7.1 hr |
| 5 | 2000 ppm Y7BH1100 | 8.0 hr |
| 6 | 2000 ppm Y7BH1018 | 6.3 hr |

TABLE III

| Rancimat Results | | |
|---|---|---|
| Ex. | Fuel 1878-119-6 | |
| 7 | Blank | 3.2 hr |
| 8 | 500 ppm Y7BH1018 | 9.4 hr |
| 9 | 500 ppm Y7BH1100 | 10.3 hr |

TABLE IV

| Rancimat Results | | |
|---|---|---|
| Ex. | Fuel 1878-119-5 | |
| 10 | Blank | 6.5 hr |
| 11 | 500 ppm Y7BH1018 | 14.3 hr |
| 12 | 500 ppm Y7BH1100 | 15.8 hr |

TABLE V

| Rancimat Results | | |
|---|---|---|
| Ex. | Fuel 1878-118-8 | |
| 13 | Blank | 9.4 hr |
| 14 | 500 ppm Y7BH1018 | 15.7 hr |
| 15 | 1000 ppm Y7BH1018 | 18.4 hr |
| 16 | 1500 ppm Y7BH1018 | 21.1 hr |

TABLE VI

| Rancimat Results | | |
|---|---|---|
| Ex. | Fuel 1878-118-6 | |
| 17 | Blank | 4.2 hr |
| 18 | 500 ppm Y7BH1018 | 5.3 hr |

TABLE VI-continued

Rancimat Results

| Ex. | Fuel 1878-118-6 | |
|---|---|---|
| 19 | 1000 ppm Y7BH1018 | 6.1 hr |
| 20 | 1200 ppm Y7BH1018 | 6.4 hr |
| 21 | 1500 ppm Y7BH1018 | 6.9 hr |
| 22 | 2000 ppm Y7BH1018 | 7.3 hr |

TABLE VII

Rancimat Results

| Ex. | Fuel 1878-118-9 | |
|---|---|---|
| 23 | Blank | 4.5 hr |
| 24 | 250 ppm Y7BH1018 | 6.2 hr |
| 25 | 500 ppm Y7BH1018 | 6.6 hr |
| 26 | 1000 ppm Y7BH1018 | 7.5 hr |
| 27 | 1500 ppm Y7BH1018 | 8.7 hr |

TABLE VIII

Rancimat Results

| Ex. | Fuel 1878-117-1 | |
|---|---|---|
| 28 | Blank | 3.1 hr |
| 29 | 500 ppm Y7BH1018 | 4.2 hr |
| 30 | 1000 ppm Y7BH1018 | 7.8 hr |

TABLE IX

Rancimat Results

| Ex. | Fuel 1878-118-3 | |
|---|---|---|
| 31 | Blank | 6.5 hr |
| 32 | 500 ppm Y7BH1018 | 7.7 hr |
| 33 | 1000 ppm Y7BH1018 | 9.5 hr |
| 34 | 2000 ppm Y7BH1018 | 10.2 hr |

TABLE X

Rancimat Results

| Ex. | Fuel 1878-118-4 | |
|---|---|---|
| 35 | Blank | 4.2 hr |
| 36 | 1000 ppm Y7BH1018 | 6.4 hr |
| 37 | 1500 ppm Y7BH1018 | 7.5 hr |
| 38 | 2000 ppm Y7BH1018 | 8.0 hr |

TABLE XI

Rancimat Results

| Ex. | Fuel 1878-118-7 | |
|---|---|---|
| 39 | Blank | 3.5 hr |
| 40 | 1000 ppm Y7BH1018 | 5.3 hr |
| 41 | 2000 ppm Y7BH1018 | 7.4 hr |
| 42 | 2500 ppm Y7BH1018 | 8.4 hr |

It may be seen from the results in Tables II-XI that alkyl phenol amine aldehyde condensates used alone consistently improve the oxidative stability of a wide variety of biofuels as measured by the Rancimat test, and dramatically improved the stability of certain biofuels, notably those of Tables III and IV. In all cases, increased amounts of additive increased the Rancimat test result; note particularly Tables II, V, VI, VII, VIII, IX, X and XI.

Tables XII-XIV next present the Rancimat test results for both additives where only an alkyl phenol amine aldehyde condensate, only an alkyl phenylene diamine, and also blends where an alkyl phenol amine aldehyde condensate together with an alkyl phenylene diamine are used. For clarity, the blends are denoted; alkyl phenol amine aldehyde condensate is abbreviated APAAC and alkyl phenylene diamine is abbreviated APDA. It may be seen that the blends give consistently better results than the individual components alone when used at the same dosage levels indicating synergistic results. This is particularly evident in Tables XII and XIII where the same total amounts of additives are used.

TABLE XII

Rancimat Results

| Ex. | Fuel 1878-118-8 | Type | |
|---|---|---|---|
| 43 | Blank | — | 8.6 hr |
| 44 | 500 ppm Y7BH1019 | APDA | 13.8 hr |
| 45 | 500 ppm Y7BH1018 | APAAC | 15.8 hr |
| 46 | 500 ppm Y7BH1068 | Blend | 17.1 hr |

TABLE XIII

Rancimat Results

| Ex. | Fuel 1878-119-5 | Type | |
|---|---|---|---|
| 47 | Blank | — | 6.5 hr |
| 48 | 500 ppm Y7BH1019 | APDA | 12.7 hr |
| 49 | 500 ppm Y7BH1018 | APAAC | 14.3 hr |
| 50 | 500 ppm Y7BH1068 | Blend | 15.8 hr |

TABLE XIV

Rancimat Results

| Ex. | Fuel 1878-119-7 | Type | |
|---|---|---|---|
| 51 | Blank | — | 0.2 hr |
| 52 | 750 ppm Y7BH1019 | APDA | 1.8 hr |
| 53 | 2000 ppm Y7BH1018 | APAAC | 6.3 hr |
| 54 | 1200 ppm Y7BH1100 | APAAC | 6.5 hr |
| 55 | 1500 ppm Y7BH1100 | APAAC | 7.1 hr |
| 56 | 850 ppm Y7BH1068 | Blend | 6.5 hr |
| 57 | 1000 ppm Y7BH1068 | Blend | 7.1 hr |
| 58 | 500 ppm Y7BH1099 | Blend | 6.0 hr |
| 59 | 850 ppm Y7BH1099 | Blend | 7.3 hr |

The majority of the previous data was collected using Soy Methyl Ester (SME) biodiesel. The data collected in Tables XV and XIX was by using Rapeseed Methyl Ester (RME) biodiesel.

TABLE XV

Rancimat Results

| Ex. | Fuel RME #1 | |
|---|---|---|
| 60 | Blank | 3.6 hr |
| 61 | 500 ppm Y7BH1100 | 7.6 hr |
| 62 | 500 ppm Y7BH1099 | 8.8 hr |
| 63 | 500 ppm Y7BH1018 | 6.9 hr |

TABLE XVI

Rancimat Results

| Ex. | Fuel RME #2 | |
|---|---|---|
| 64 | Blank | 3.4 hr |
| 65 | 500 ppm Y7BH1100 | 7.0 hr |
| 66 | 100 ppm Y7BH1099 | 5.2 hr |
| 67 | 250 ppm Y7BH1099 | 6.7 hr |
| 68 | 400 ppm Y7BH1099 | 7.6 hr |
| 69 | 500 ppm Y7BH1099 | 8.2 hr |
| 70 | 750 ppm Y7BH1099 | 9.4 hr |

TABLE XVII

Rancimat Results

| Ex. | Fuel RME #3 | |
|---|---|---|
| 71 | Blank | 3.8 hr |
| 72 | 250 ppm Y7BH1099 | 5.5 hr |
| 73 | 500 ppm Y7BH1099 | 6.6 hr |
| 74 | 1000 ppm Y7BH1099 | 8.5 hr |
| 75 | 250 ppm Y7BH1100 | 4.7 hr |
| 76 | 500 ppm Y7BH1100 | 5.4 hr |
| 77 | 1000 ppm Y7BH1100 | 6.8 hr |

TABLE XVIII

Rancimat Results

| Ex. | Fuel RME #4 | |
|---|---|---|
| 78 | Blank | 1.3 hr |
| 79 | 250 ppm Y7BH1018 | 2.2 hr |
| 80 | 500 ppm Y7BH1018 | 2.9 hr |
| 81 | 1000 ppm Y7BH1018 | 3.0 hr |

TABLE XIX

Rancimat Results

| Ex. | Fuel 1878-119-1 | |
|---|---|---|
| 82 | Blank | 2.9 hr |
| 83 | 250 ppm Y7BH1099 | 8.5 hr |
| 84 | 500 ppm Y7BH1099 | 9.9 hr |
| 85 | 750 ppm Y7BH1099 | 10.4 hr |
| 86 | 250 ppm Y7BH1100 | 7.6 hr |
| 87 | 500 ppm Y7BH1100 | 8.4 hr |
| 88 | 750 ppm Y7BH1100 | 9.0 hr |

In the foregoing specification, the invention has been described with reference to specific embodiments thereof. It has been demonstrated as effective in providing methods and compositions for improving biofuels, particularly increasing oxidative stability. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of alkyl phenylene diamines, alkyl phenol amine aldehyde condensates, biofuels, and other components falling within the claimed parameters, but not specifically identified or tried in a particular composition or under specific conditions, are anticipated to be within the scope of this invention.

As used herein, the word "comprising" as used throughout the claims is to be interpreted to mean "including but not limited to".

The present invention may suitably comprise, consist or consist essentially of the elements disclosed and may be practiced in the absence of an element not disclosed.

What is claimed is:

1. A B100 biofuel composition comprising:

combustible hydrocarbons comprising hydrocarbons from biological source feedstocks; wherein the combustible hydrocarbons have a minimum ester content of 96.5 wt %; and an alkyl phenol amine aldehyde condensate in an amount effective to improve the stability of the fuel.

2. The biofuel composition of claim 1 where the alkyl phenol amine aldehyde is present in an amount ranging from about 10 to about 10,000 ppm, based on the B100 biofuel.

3. The biofuel composition of claim 1 where the alkyl phenol amine aldehyde condensate has the general formula:

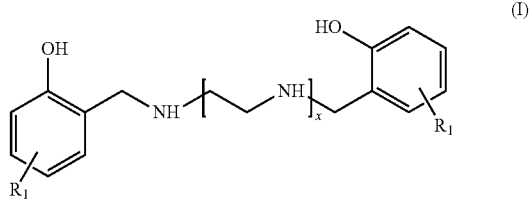

where the $R_1$ groups are independently straight or branched alkyl groups of $C_1$-$C_{20}$, and where x ranges from 1 to 5.

4. The biofuel composition of claim 1 where the B100 biofuel further comprises an alkyl phenylene diamine in an amount effective to improve the stability of the B100 biofuel.

5. The biofuel composition of claim 4 where the alkyl phenylene diamine has the general formula:

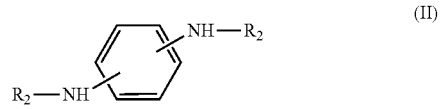

where the $R_2$ groups are independently straight or branched alkyl groups of $C_1$-$C_{20}$.

6. The biofuel composition of claim 1 where the alkyl phenylene diamine is present in the B100 biofuel in an amount ranging from about 10 to about 10,000 ppm.

7. A B100 biofuel composition comprising:

combustible hydrocarbons comprising hydrocarbons from biological source feedstocks; wherein the combustible hydrocarbons have a minimum ester content of 96.5 wt %;

an alkyl phenol amine aldehyde condensate in an amount ranging from about 10 to about 10,000 ppm based on the B100 biofuel;

an alkyl phenylene diamine in an amount effective to improve the stability of the B100 biofuel.

8. The biofuel composition of claim 7 where the alkyl phenol amine aldehyde condensate has the general formula:

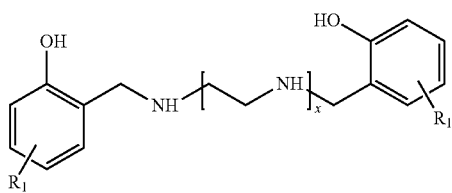

(I)

where the $R_1$ groups are independently straight or branched alkyl groups of $C_1$-$C_{20}$, and where x ranges from 1 to 5.

9. The biofuel composition of claim 7 where the alkyl phenylene diamine has the general formula:

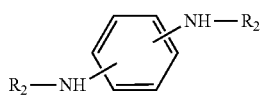

(II)

where the $R_2$ groups are independently straight or branched alkyl groups of $C_1$-$C_{20}$.

10. The biofuel composition of claim 7 where the alkyl phenylene diamine is present in the B100 biofuel in an amount ranging from about 10 to about 10,000 ppm.

11. A B100 biofuel composition comprising:
   combustible hydrocarbons from biological source feedstocks; wherein the combustible hydrocarbons have a minimum ester content of 96.5 wt %;
   an alkyl phenol amine aldehyde condensate in an amount ranging from about 10 to about 10,000 ppm based on the B100 biofuel; and
   an alkyl phenylene diamine in an amount ranging from about 10 to about 10,000 ppm based on the biodiesel fuel.

12. The biofuel composition of claim 11 where the alkyl phenol amine aldehyde condensate has the general formula:

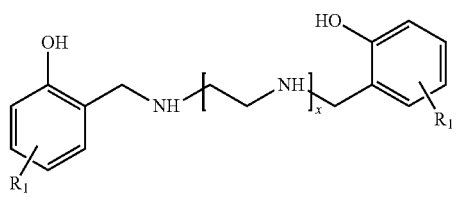

(I)

where the $R_1$ groups are independently straight or branched alkyl groups of $C_1$-$C_{20}$, and where x ranges from 1 to 5.

13. The biofuel composition of claim 11 where the alkyl phenylene diamine has the general formula:

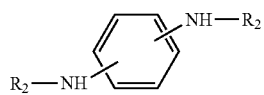

(II)

where the $R_2$ groups are independently straight or branched alkyl groups of $C_1$-$C_{20}$.

* * * * *